Figure 1:
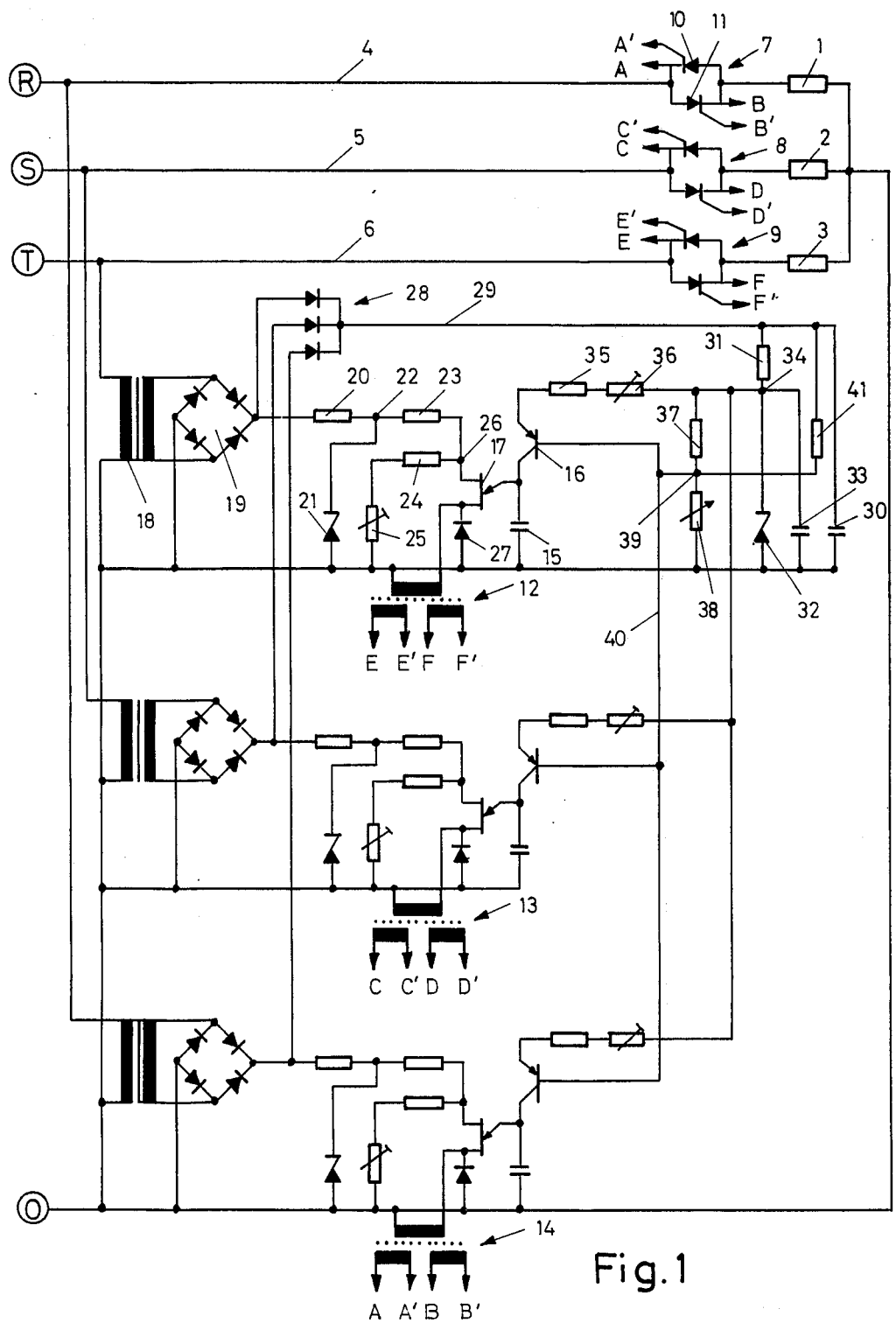

United States Patent [19]
Thorsoe

[11] 3,946,304
[45] Mar. 23, 1976

[54] PHASE-INITIATION CONTROL ARRANGEMENT, PARTICULARLY FOR A THREE-PHASECONSUMER UNIT

[75] Inventor: Flemming Thorsoe, Augustenborg, Denmark

[73] Assignee: Danfoss A/S, Nordborg, Denmark

[22] Filed: May 24, 1972

[21] Appl. No.: 256,619

Related U.S. Application Data

[63] Continuation of Ser. No. 43,908, June 5, 1970.

[52] U.S. Cl. .............................. 323/24; 307/252 T
[51] Int. Cl.² ........................................... G05F 5/00
[58] Field of Search ....... 307/252 T; 323/22 SC, 24, 323/38

[56] References Cited
UNITED STATES PATENTS 3,437,911  4/1969  Gutzwiller ......................... 323/24 X
3,487,292  12/1969  Tibbetts ........................... 323/24 X

OTHER PUBLICATIONS

G. E. SCR Manual, 4th Edition, pp. 189–191, 205–207; 1967.

Primary Examiner—William M. Shoop

[57] ABSTRACT

The invention relates to a phase initiation control circuit for a three phase system which comprises three sets of blocking elements of the TRIAC type. Regulation is achieved by displacing the moment at which a control impulse is sent to each blocking element to render it conducting for the remainder of the half cycle. Associated with each phase is a continuously chargeable capacitor which, upon a predetermined voltage being reached, discharges to produce a control impulse and also is completely discharged through the collector emitter path of a junction transistor at the zero cross-over of the particular voltage phase. The capacitors are charged through charging transistors and are discharged to produce said control impulses through unijunction transistors and impulse transformers.

4 Claims, 4 Drawing Figures

PHASE-INITIATION CONTROL ARRANGEMENT, PARTICULARLY FOR A THREE-PHASECONSUMER UNIT

This is a continuation of application Ser. No. 43,908, filed June 5, 1970.

The invention relates to a phase-initiation control arrangement, particularly for a three-phase consumer unit, in which arrangement blocking elements are each rendered conducting by a control impulse in each phase and remain conducting until the end of the half-cycle.

Regulation can be achieved by displacing the moment at which the control impulse is sent and the blocking element rendered conducting. A single-phase phase-initiation control arrangement would be used for example for regulating the speed of single-phase motors, for regulating a lighting system or for regulating the capacity of electric furnaces. Since, in all these contexts, the control impulse does not need to be set at a particularly precise moment, it suffices to use relatively simple impulse generators which, for example, are operable with the help of an adjusting resistor which may also be dependent upon a physical factor.

There are however applications in which the variable moment at which the control impulse occurs must be establised with great precision. This applies particularly in the case of a phase-initiation control arrangement for a three-phase consumer unit. Here, although the ignition moment should likewise be capable of being varied with the help of a resistor or the like, the control impulses for the blocking elements in the three phases should however be precisely displaced relatively to each other by 120°, so that the same conditions occur in all the phases. This is especially important in the case of a motor-control system or when regulating illuminating systems.

In the case of a three-phase phase-initiation arrangement it is known for example to use a zero detector and three monostable multi-vibrators. The first multi-vibrator is associated with that phase in which the detector measures cross-over through zero. The other multi-vibrators are associated with the two other phases. The first multi-vibrator is controlled by the detector and sends an output signal after an adjustable time-lag. This output signal controls the first blocking element and the second multi-vibrator. The later in turn sends an output signal after 120° (this corresponding to 6.66 ms at 50 cycles), which signal controls the blocking element in the second phase and the third multi-vibrator. The latter, after 120°, produces a control signal for the third phase. Such an arrangement requires the use of considerable numbers of electronic parts (zero crossover detector, three multi-vibrators, stabilized a.c. voltage supply means etc.) and very great stability in the constant time-lags. Inaccuracies lead to troubles particularly in the case of a phase-initiation near the commencement or end of the half-cycle.

The object of the invention is to provide a phase-initiation control arrangement which is particularly suitable for a three-phase consumer unit and which, despite a simple connection system, enables the moment at which the blocking elements are switched in to be established with very great accuracy.

According to the invention, this object is achieved by there being associated with each phase a continuously chargeable condenser which, upon a predetermined voltage being reached, discharges to produce the control impulse and is also discharged in the zero cross-over of the particular phase voltage.

Because of the discharge in the zero cross-over, there is created in each half-cycle an initial condition that is precisely defined as regards time and electrically. By appropriate choice of the charging rate of the discharging voltage, the moment at which the control impulse is produced can be accurately established. In a three-phase control arrangement, these similar condenser connections are used which can be balanced and jointly controlled. The ignition moment of the blocking element is in each case determined by the first discharge of the condenser in each half-cycle. It is permissible for the condenser to produce further control impulses during the further course of the half-cycle; these cause no harm since the blocking element of course remains conducting up to the end of the half-cycle. Even if a control impulse should occur in the zero cross-over during discharge, this is generally of no disadvantage since no voltage is of course available to keep the blocking element conducting. If required, a control impulse can also be supported at this moment. A particularly simple connection arrangement is obtained if the condenser discharges through a unijunction transistor and an impulse transformer. The voltage between the first and second bases of the transistor determines the discharge voltage of the condenser. When this discharge voltage is reached, the condenser can discharge in the shortest time through the transistor, so that the impulse transformer sends a powerful impulse.

In a three-phase phase-initiation control arrangement the condensers for all three phases are preferably each capable of being charged through a charging transistor having an omitter resistor, the bases of all three charging transistors are connected to a common voltage, which can be tapped off at a voltage divider for adjusting the lead angle, and the emitter resistors of all three charging transistors are separately adjustable. The charging transistors determine the charging rate of the condensers. With the help of the adjustable emitter resistors, all three condensers can be charged at the same rate for a given working point. Since a common adjustable voltage is applied to the bases, the loading rate of all three condensers can be uniformly altered by an adjustment at the associated voltage divider.

Advantageously, there is associated with each unijunction transistor an adjustable voltage divider which determines the voltage between the first and second bases. In this way the unijunction transistors can be synchronized with each other in such manner that the associated condensers are discharged at the same voltage.

A very advantageous compensation effect is achieved with the help of an additional resistor which is connected at one side to the bases of the charging transistors and at the other to an a.c. voltage that follows the fluctuations in the mains voltage. By means of this additional resistor, the base voltage of the charging transistors is increased as the mains voltage rises. Consequently the rate at which the condensers are charged drops and the ignition of the blocking elements occurs after a time-lag. This results in a lower current which, in conjunction with the higher mains voltage, leads to an approximately constant power.

Various steps can be taken to discharge the condenser in the zero cross-over. An advantageous method is that of providing an a.c. voltage between the first and second bases of the unijunction transistor, which voltage is however brought to practically zero in the voltage-zero cross-over. This is done by for example using a trapezoidal voltage, which is obtained from the particular phase-voltage by two-way rectification. Since the voltage between the first and second bases determines the voltage at which the condenser can discharge, this ensures that discharge of the condenser takes place in any case at the moment of cross-over through zero. The amplitude of the trapezoidal voltage, which is fixed, for example, by means of a Zener diode, determines the discharge voltage at the normal moment of ignition.

In another advantageous aspect of the invention, there is a first path through which the condenser discharges to send the control impulses, and a second path through which the condenser discharges in the zero cross-over of the particular phase-voltage. This ensures that discharge in the zero cross-over does not lead to the production of a control impulse.

For example, the unijunction transistor can be located in the first path, and the voltage between its first and second bases can be a constant a.c. voltage, while in the second path there can be provided a discharge transistor, the emitter-collector gap of which by-passes the condenser, and the base of which receives a discharge impulse in the zero cross-over of the particular phase-voltage.

The particular phase-voltage can for example undergo a two-way rectification, and the discharge impulse can be obtained from the mutually limiting flanks of the half-waves. This can be achieved by differentiation for instance.

In a preferred arrangement, a substantially constant a.c. voltage is applied to one side of a voltage divider and an opposed two-way rectified phase-voltage is applied to the other, and the tapping leading to the base of the discharge transistor is so arranged that at the moment at which the phase-voltage crosses over through zero, the transistor is rendered conducting for a brief period. There is therefore applied to the voltage divider the sum of the constant a.c. voltage and of the rectified phase-voltage. The tapped-off voltage follows this total voltage proportionally. It is only necessary to select the reference voltage of the transistor in such manner that the basis voltage is displaced each time in the direction of the collector potential to an extent such that the emitter voltage is slightly exceeded. Expediently, a rectifier is provided between the tapping and the base. This ensures that the discharge transistor does not break down as a result of too high a base voltage. The voltage at the tapping that can therefore be of considerable amplitude, so that, near the zero cross-over, the rectified voltage halfwaves meet by their very sharp angles. The period during which the discharge transistor is conducting can thus be reduced to very small values (e.g. 1°–2°).

In a further embodiment of the invention, the voltage divider for adjusting the lead angle consists of at least two resistors with a compensation transistor disposed between them, this transistor being similar to the loading transistors and having its collector and base interconnected. If, for the purpose of achieving a high charging rate, the charging transistors carry more current and therefore become warmer, the compensation transistor also undergoes a greater degree of warming up, whereby the base voltage of the charging transistors is affected in the sense of providing compensation.

Figure 2:
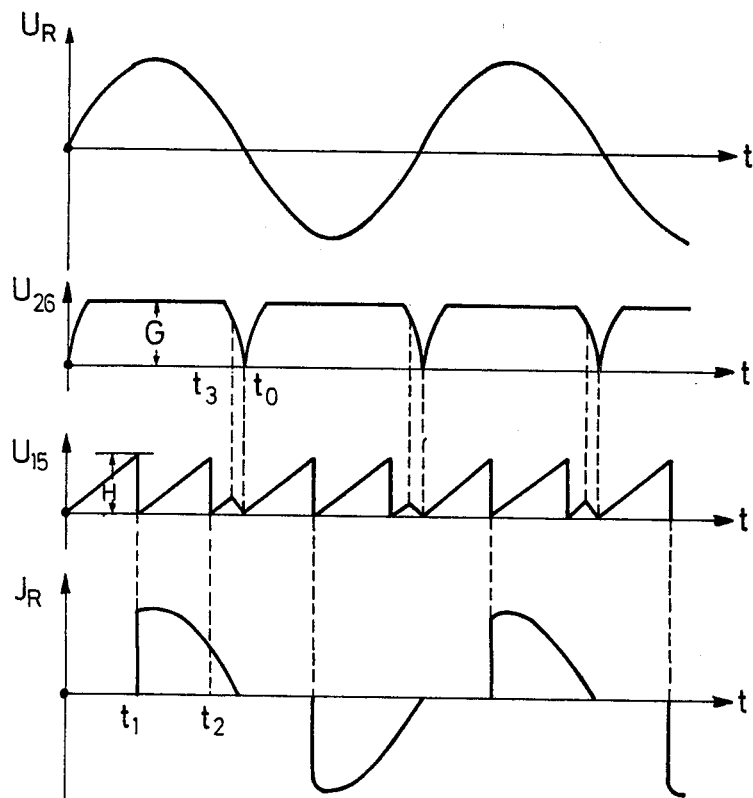
Figure 4:
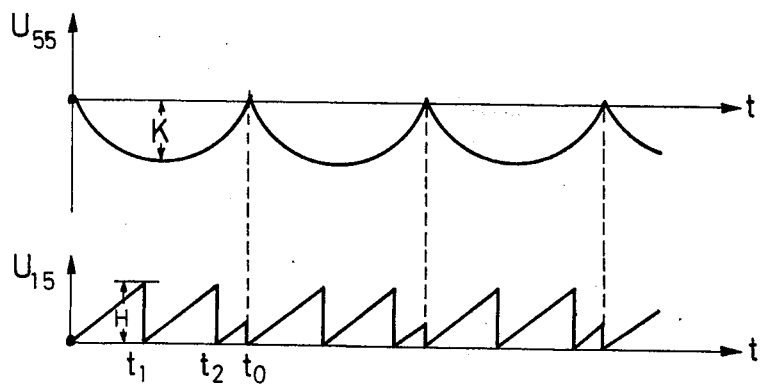
Figure 3:
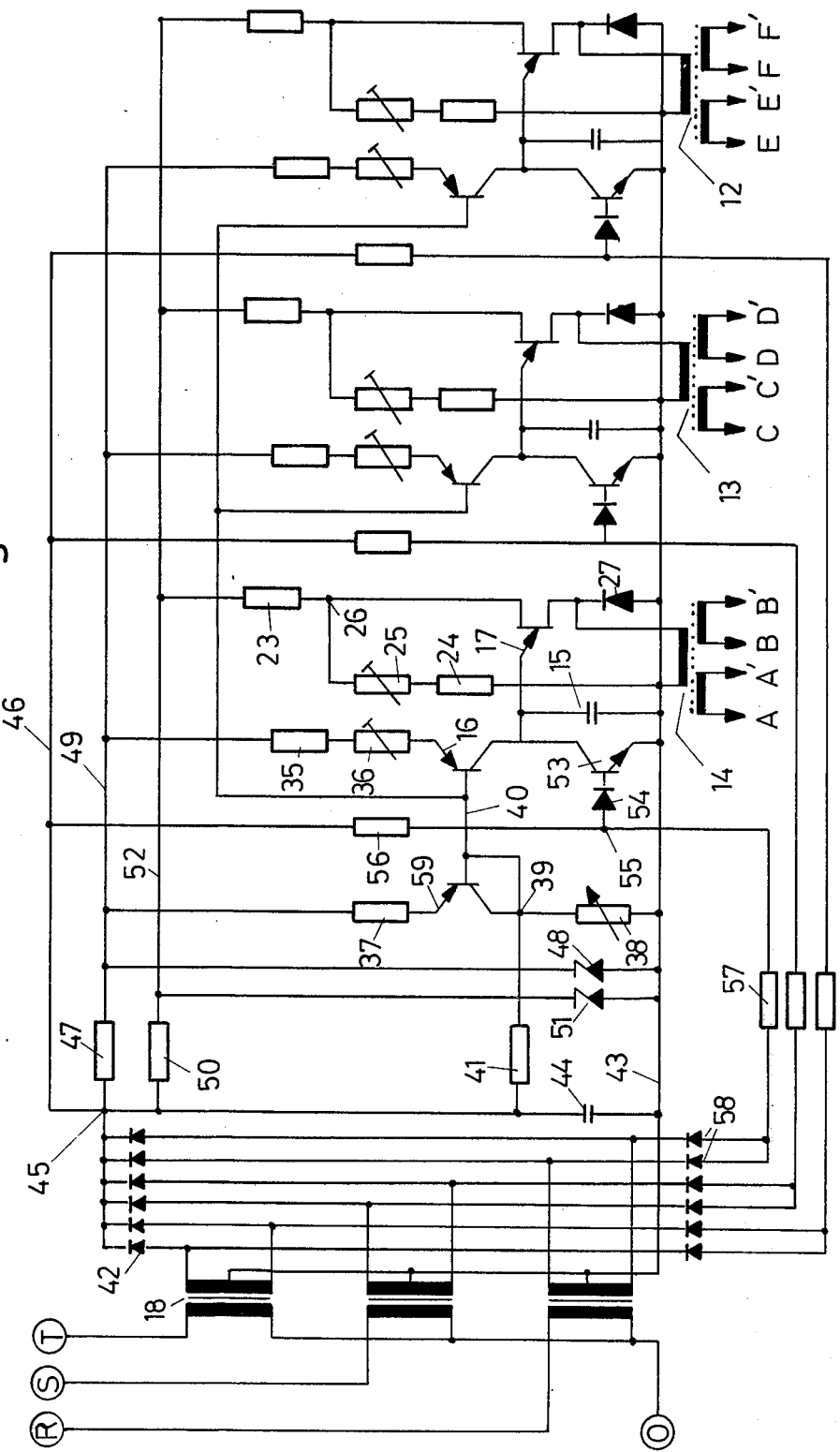

The invention will now be described in more detail by reference to embodiments illustrated in the drawing, in which:

FIG. 1 shows the circuitry of a first embodiment of a phase-initiation control arrangement in accordance with the invention, FIG. 2 shows the voltage and current curves in this arrangement, FIG. 3 shows a second embodiment of an arrangement in accordance with the invention, and FIG. 4 shows the voltage and current curves in this arrangement.

FIG. 1 shows a supply system having the phase R, S, T and which supplies a three-phase consumer unit having impedances 1, 2 and 3. In each of the three-phase conductors 4, 5 and 6 is an electronic blocking element 7, 8 and 9 each of which, in the present embodiment, consists of two controlled semi-conductor diodes 10 and 11, connected in anti-parallel, such as are obtainable for example under the trade name TRIAC. Each controlled rectifier is connected by one pole and a secondary electrode to an output of three impulse transformers 12, 13 and 14. The conductors associated with each other are indicated by the reference letters A–A', B–B', C–C', D–D', E–E' and F–F'. As long as a control impulse is applied to these rectifiers, they are conducting and remain so until the current flowing through them passes through zero.

To produce the control impulses, there is associated with each phase R, S and T a condenser 15 which is charged linearly through a charging transistor 16, and is discharged through a unijunction transistor 17 when a predetermined voltage is reached. Discharge takes place through the primary winding of the associated impulse transformer, so that a control impulse occurs at the output points. It is important that the condenser 15 is also discharged at the zero cross-over of the associated phase-voltage, so that there is present a reference point that is accurately defined both as regards time and electrically. Since the arrangement in question is the same for all three phases, it is described for one phase only.

The phase-voltage is supplied to a two-way rectifier 19 by way of a transformer 18. The half-waves tapped off at the output point of this rectifier are applied to a Zener diode 21 by way of a series resistor 20, so that a trapezoidal voltage is available at the point 22. This voltage is applied to a voltage divider which comprises the resistors 23 and 24 and the adjustable resistor 25. Consequently, the amplitude of the voltage available at the point 26 can be adjusted. This voltage, which is applied between the first and second bases of the unijunction transistor 17, determines that voltage value at which the continuously charging condenser 15 discharges. Since the voltage at the point 26 is approximately zero in the zero cross-over, discharge of the condenser also occurs at this moment, independently of the extent to which the condenser has been charged. A rectifier 27 enables the magnetic field, produced in the transformer 12–14 when the control impulse is produced, to be broken down again. The output points of all the two-way rectifiers 19 are combined through a rectifier arrangement 23, so that there obtains in a conductor 28 an a.c. voltage which is almost equal to the amplitude of the phase-voltage. This voltage is smoothed by a condenser 30. This voltage is supplied through a series resistor 31 to a Zener diode 32 and a condenser 33, connected in parallel, so that a stabilized constant a.c. voltage is available at the point 34. The charging transistors 16 are supplied with this a.c. voltage through two emitter resistors 35 and 36, the latter of which is adjustable. By adjusting the resistor 36, all the charging transistors 16 can be caused to carry the same current at the same working point and thus the coefficient of inclination is the same when the condenser 15 is charged.

Furthermore, the voltage at the point 34 is applied to a voltage divider which consists of the resistors 37 and 38, the latter of which is adjustable. At the tapping point 39 there exists a voltage which is fed through a conductor 40 to the bases of all the charging transistors 16. A change in the resistor 38 thus leads to a change in the base voltage and therefore to a change in the charging rate of the condensers 15. The slower the condensers charge, the later is the control impulse sent. Also, connected to the point 39 is a resistor 41, the other end of which is connected to the conductor 29. If the mains voltage rises, the a.c. voltage in the conductor 29 also rises. This causes the voltage at the point 39 to rise, so that the current flowing through the loading transistors 16 is choked. The charging rate of the condensers 15 drops and a reduced phase current is associated with the higher phase voltage.

The mode of operation of the arrangement shown in FIG. 1 can be seen from FIG. 2, which illustrates the conditions for one phase, which are however repeated in the other two phases each offset through 120 electrical degrees. Plotted in turn against time are the phase-voltage $U_R$
the trapezoidal voltage $U_{26}$ at the point 26
the condenser voltage $U_{15}$ at the condenser 15, and
the phase current $I_R$.

It will be assumed that the load 1, 2 and 3 is purely ohmic and that the phase-voltage $U_R$ is of approximately constant amplitude. The amplitude G of the trapezoidal voltage $U_{26}$ is then determined by the Zener diode 21 and by the setting of the resistor 25. It determines the breakdown voltage of the unijunction transistor 17 and thus the amplitude H of the condenser voltage $U_{15}$. The condenser 15 is continuously charged until its voltage reaches the value H; it then discharges through the impulse transformer 12. This occurs at the moment $t_1$. The resultant control impulse ignites the associated rectifier 11, and the phase current $I_R$ begins to flow until the next current zero cross-over is reached. The condenser 15 begins to charge again after the first discharge, and at the moment $T_2$ the voltage H is reached again, whereupon a second discharge takes place and a second control impulse is set. This causes no harm since the rectifier 11 is alreay conducting. Shortly before the zero cross-over at the moment $t_0$ of the phase-voltage $U_R$, the trapezoidal voltage $U_{26}$ begins to decrease. As soon as it has reached a point corresponding to the particular state of charge of the condenser 15, this condenser discharges, beginning at the moment $t_3$, until it is completely discharged at the moment $t_0$. A fresh charging-discharging cycle begins, which this time benefits the other half-wave of the phase-current. If the resistor 38 is now displaced, the slope of the condenser voltage $U_{15}$ changes and thus do does the position of the moment $t_1$.

For the purpose of making an adjustment, all three input transformers 18 are expediently connected to the same phase. The condenser voltages $U_{15}$ are then connected in pairs to a calibrated double beam oscilloscope. Then, the slope of the voltage $U_{15}$ can simply be altered by adjusting the resistor 36 and the amplitude of this voltage altered by adjusting the resistor 15 until the images representing the voltages are in precise register.

In the case of the embodiment seen in FIG. 3, only the impulse generator is illustrated. Similar parts are indicated by the same reference symbols as in FIG. 1. Since the same arrangement applies to all three phases, again only the part of the control arrangement associated with one phase is marked with reference symbols.

The voltages of all three input transformers 18 are applied, through a two-way rectifier arrangement 14, having a common neutral conductor 43, and by way of a smoothing condenser 44, to a point 45 from which the smoothed a.c. voltage can be directly tapped off through the conductor 46, whereas a series resistor 47 and a Zener diode 48 produce a first stabilized a.c. voltage in a conductor 49, and a series resistor 50 and a Zener diode 51 produce a second stabilized a.c. voltage in a conductor 52.

The voltage in the conductor 49 is used for charging the condenser 15 through the charging transistor 16. The stabilized a.c. voltage in the conductor 52 is applied through the unijunction transistor through a resistor 23. Consequently, the breakdown voltage of the transistor 17 remains constant during operation. The unijunction transistor 17 and the impulse transformers 12–14 therefore form a first path through which the condenser 15 can only be discharged when the constant breakdown voltage of the transistor 17 has been reached.

For discharge at the zero point there is provided a second path which consists substantially of a discharge transistor 53. The base of this transistor is connected through a diode 54 to the tapping 55 of a voltage divider consisting of two resistors 56 and 57. The smoothed a.c. voltage $U_{46}$ is applied at one side of this voltage divider and the associated phase voltage is applied at the other side through each of a pair 58 of rectifiers and through the transformer 18. Since the smoothed a.c. voltage works in the positive sense and the phase-voltage, on the other hand, in the negative sense, the voltage divider 56, 57 is influenced by the sum of the two voltages. Whenever the voltage at the tapping 55 rises above the zero point, i.e. when the emitter voltage fixed by the neutral lead 43 rises, the discharge transistor 33 becomes conducting and the condenser 15 can discharge through this second path without producing a central impulse. As can be seen from FIG. 4, this discharge process occurs very precisely in the zero cross-over of the phase-voltage.

The common voltage control of the bases of the charging transistors 16 is again achieved by connecting a common distributing conductor 40 to the tapping of a voltage divider consisting of the resistors 37 and 38. The voltage divider is supplied with stabilized a.c. voltage in the conductor 49. However, a compensation resistor 59 is also connected in series with the voltage divider and the basis and collector of this transistor are interconnected. This transistor is so connected that its base-emitter gap operates in the same way as those of the charging resistors 16. Consequently the temperature and current heat are compensated. The compensation resistor 41 operates in the same way as in the arrangement shown in FIG. 1.

In FIG. 4 the discharge voltage $U_{55}$ at point 55, and the condenser voltage $U_{15}$ at the condenser 15 are plotted against time $t$.

The phase-voltage $U_R$ and the phase-current $I_R$ follow the same course as in FIG. 2.

Whereas the charging and discharging of the condenser 15 proceeds by way of the unijunction transistor 17 in a similar manner to that of FIG. 1, the discharge at the moment $t_0$ occurs by way of the discharging transistor 53. The voltage divider 56, 57 is so designed that a positive voltage occurs at the tapping 56 only at the moment $t_0$. In order to ensure that the discharging transistor 53 becomes conducting, the voltage $U_{55}$ must rise to +2V for instance. On the other hand, the positive voltage peak should not be very wide in order to establish a definite moment at which discharge takes place. Values of less than 2° are desirable. These can be readily achieved if the amplitude K of the voltage $U_{55}$ is great. In this case, the diode 54 prevents the discharging transistor 53 from suffering breakdown as a result of the high negative voltage. In this way, the moment at which the condenser 15 discharges is very precisely defined in the zero cross-over. Since there is no resistor at all in the second path, complete discharge of the condenser 15 is also ensured. In the case of one typical arrangement, the following values for voltage applied Voltage $U_{46}$ in the conductor 46 = 44 V
Voltage $U_{49}$ in the condenser 49 = 27 V
Voltage $U_{52}$ in the conductor 52 = 22 V.

The arrangement was designed to be suitable for an ignition angle range of 10°–180°. A smaller ignition angle is not necessary in practice, since when with an ignition angle of 10° the effective output voltage still corresponds to 99.95% of the output voltage with an ignition angle of 0°. The charging current is of course eighteen times greater with an ignition angle of 10° then with an ignition angle of 180°. This results in a considerable thermal effect, particularly in the base-emitter gaps of the charging transistor 16. Since however, the base-emitter gap of the compensation transistor 59 is connected in the way way, the base voltage of the charging transistor 16 is changed in the opposite direction. As in the case of the arrangement seen in FIG. 1, the control arrangements for the individual phases are so balanced, by adjusting the resistors 25 and 26, that they operate in the same manner. By adjusting the transistors 38, the slope of the condenser voltage $U_{15}$ and thus the moment $t_1$ at which ignition occurs are thus changed.

I claim:

1. A phase initiation control circuit for a three phase system comprising three pairs of blocking elements, one pair for each phase, each of said blocking elements being of a type which is rendered conducting by a control impulse and remains conducting until the end of the half-cycle; means for deriving a substantially constant direct current voltage from the three phase input to said system; means for deriving three pulsating direct current voltages from said three phase input to said system, said pulsating voltages being respectively synchronized with the three phases of said input; and, for each phase, a capacitor, charging means, first discharging means, second discharging means, an impulse transformer having a primary winding and two secondary windings, a voltage divider which is connected between said substantially constant direct current voltage and the pulsating direct current voltage corresponding to said phase, and a tapping on said voltage divider, the charging means being such as to continuously charge said capacitor from said substantially constant direct current voltage, the first discharging means being such as to discharge the capacitor upon a predetermined voltage across the capacitor being reached, discharge of the capacitor by the first discharging means producing a voltage across said primary winding, said secondary windings being directly connected to the respective blocking elements of the associated pair of blocking elements for said phase, said voltage across said primary winding causing voltage control impulses in said secondary windings to cause said blocking elements to conduct, and said second discharging means comprising a junction transistor having emitter, collector and base electrodes, the emitter-collector path of said transistor being connected across said capacitor, said base of said transistor being connected to said tapping on said voltage divider, said substantially constant direct current voltage and said corresponding pulsating direct current voltage having a common reference potential point to which point said emitter of said transistor is connected whereby the emitter collector path of said transistor is rendered conducting when said voltage of said phase passes through zero, so completely discharging said capacitor.

2. A phase initiation control circuit according to claim 1, wherein said emitter of said transistor is connected to said tapping on said voltage divider through a rectifier.

3. A phase initiation control circuit according to claim 1 wherein said means for providing a substantially constant direct current voltage is common to all three phases of said three phase input.

4. A phase initiation control circuit according to claim 1 comprising further means to supply a second substantially constant direct current voltage common for all three phases of said three phase input, said further means forming part of said charging means for each phase.

* * * * *